US012565856B2

(12) United States Patent
Merchant et al.

(10) Patent No.: US 12,565,856 B2
(45) Date of Patent: Mar. 3, 2026

(54) ANTI-ICING AND BLEED HEAT SYSTEM FOR A GAS TURBINE SYSTEM

(71) Applicant: GE Infrastructure Technology LLC, Greenville, SC (US)

(72) Inventors: Laxmikant Merchant, Bengaluru (IN); Senthilkumar Jeyaraj, Bengaluru (IN)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/524,249

(22) Filed: Nov. 30, 2023

(65) Prior Publication Data

US 2025/0059913 A1 Feb. 20, 2025

(30) Foreign Application Priority Data

Aug. 16, 2023 (IN) .............................. 202311055020

(51) Int. Cl.
*F02C 7/047* (2006.01)

(52) U.S. Cl.
CPC .... *F02C 7/047* (2013.01); *F05D 2260/22141* (2013.01)

(58) Field of Classification Search
CPC .. F02C 7/045; F02C 7/047; F02C 6/08; F02C 7/04; F02C 7/08
See application file for complete search history.

(56) References Cited

U.S. PATENT DOCUMENTS

| | | | | |
|---|---|---|---|---|
| 7,913,936 B2 * | 3/2011 | Hoffmann | ............... | F02C 7/045 |
| | | | | 415/36 |
| 8,083,466 B2 * | 12/2011 | Zhang | ....................... | F02C 9/18 |
| | | | | 60/785 |
| 9,359,951 B2 | 6/2016 | Merchant et al. | | |
| 10,704,464 B2 | 7/2020 | Saraswathi et al. | | |
| 10,801,406 B2 | 10/2020 | Ponyavin et al. | | |
| 11,473,501 B2 * | 10/2022 | Gomez | .................... | F02C 6/08 |
| 2011/0162383 A1 | 7/2011 | Zhang et al. | | |
| 2014/0060774 A1 * | 3/2014 | Motakef | ................. | F02C 7/052 |
| | | | | 165/48.1 |
| 2014/0356122 A1 * | 12/2014 | Hatcher, Jr. | ........... | F01D 21/003 |
| | | | | 415/13 |
| 2017/0234220 A1 | 8/2017 | Saraswathi et al. | | |
| 2018/0274445 A1 | 9/2018 | Sankarakumar et al. | | |
| 2022/0195921 A1 * | 6/2022 | Gomez | ................... | F02C 7/047 |

* cited by examiner

*Primary Examiner* — Courtney D Heinle
*Assistant Examiner* — Andrew Thanh Bui
(74) *Attorney, Agent, or Firm* — Fletcher Yoder, PC

(57) ABSTRACT

An anti-icing system for a gas turbine system has a finned conduit that includes a heated fluid conduit defining a flowpath extending along the heated fluid conduit, and a plurality of fins spaced along the conduit and extending radially outward from the conduit. The finned conduit is configured to be installed in an air intake conduit of the gas turbine system, to receive a heated fluid flowing along the flowpath, and to transfer heat from the heated fluid to air flowing through the air intake conduit of the gas turbine system.

20 Claims, 4 Drawing Sheets

ANTI-ICING AND BLEED HEAT SYSTEM FOR A GAS TURBINE SYSTEM

CROSS-REFERENCE TO RELATED APPLICATION

This application claims priority to and benefit of India Application No. 202311055020, filed on Aug. 16, 2023; entitled "ANTI-ICING AND BLEED HEAT SYSTEM FOR A GAS TURBINE SYSTEM", which is herein incorporated by reference in its entirety.

BACKGROUND

The subject matter disclosed herein relates to an anti-icing and bleed heat system for a gas turbine system.

In general, a gas turbine system combusts a mixture of compressed air and fuel to produce hot combustion gases. More particularly, the gas turbine system includes a compressor that compresses air to generate the compressed air. The gas turbine system also includes a combustor that mixes the compressed air and the fuel to produce combustion gases. The combustion gases are directed into a turbine to drive rotation of turbine blades and a shaft that is coupled to the turbine blades. The rotation of the shaft may drive a load, such as an electrical generator that is coupled to the shaft.

In cold weather conditions or environments, ice can accumulate on the inlet filter housing through which air is drawn into the compressor. Such accumulations can negatively impact compressor performance and overall gas turbine system efficiency.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In one embodiment, an anti-icing system for a gas turbine system has a finned conduit that includes a heated fluid conduit defining a flowpath extending in an axial direction along the heated fluid conduit, and a plurality of fins spaced along the heated fluid conduit and extending radially outward from the heated fluid conduit. The finned conduit is configured to be installed in an air intake conduit of the gas turbine system, to receive a heated fluid flowing along the flowpath, and to transfer heat from the heated fluid to air flowing through the air intake conduit of the gas turbine system.

In one embodiment, a gas turbine system includes a compressor and an air intake system configured to supply a heated airflow to the compressor. The air intake system includes an air intake conduit, a filter system, and an anti-icing system. The anti-icing system includes a plurality of finned conduits disposed within the air intake system, upstream of the filter system. Each of the one or more finned conduits comprises a heated fluid conduit defining a flowpath extending in an axial direction along the heated fluid conduit and a plurality of fins spaced along the heated fluid conduit and extending radially outward from the heated fluid conduit. Each of the one or more finned conduits is configured to receive a heated fluid extracted from the compressor and flowing along the flowpath and to transfer heat from the heated fluid to air flowing through the air intake conduit of the gas turbine system.

In one embodiment, a method of operating an anti-icing system for a gas turbine system includes extracting a heated fluid from a compressor of the gas turbine system; directing the heated fluid through a heated fluid conduit of a finned conduit, wherein the finned conduit is disposed within an air intake conduit of a gas turbine system, upstream of a filter with respect to air flowing through the air intake conduit, wherein the finned conduit includes a plurality of fins spaced in an axial direction along the heated fluid conduit and extending radially outward from the heated fluid conduit, wherein the finned conduit is configured to transfer heat from the heated fluid to the air flowing through the air intake conduit of the gas turbine system; and injecting the heated fluid into the air intake conduit at a location downstream of the filter.

BRIEF DESCRIPTION OF THE DRAWINGS

These and other features, aspects, and advantages of the present anti-icing system and method will become better understood when the following detailed description is read with reference to the accompanying drawings in which like characters represent like parts throughout the drawings, wherein.

DETAILED DESCRIPTION

Figure 1:
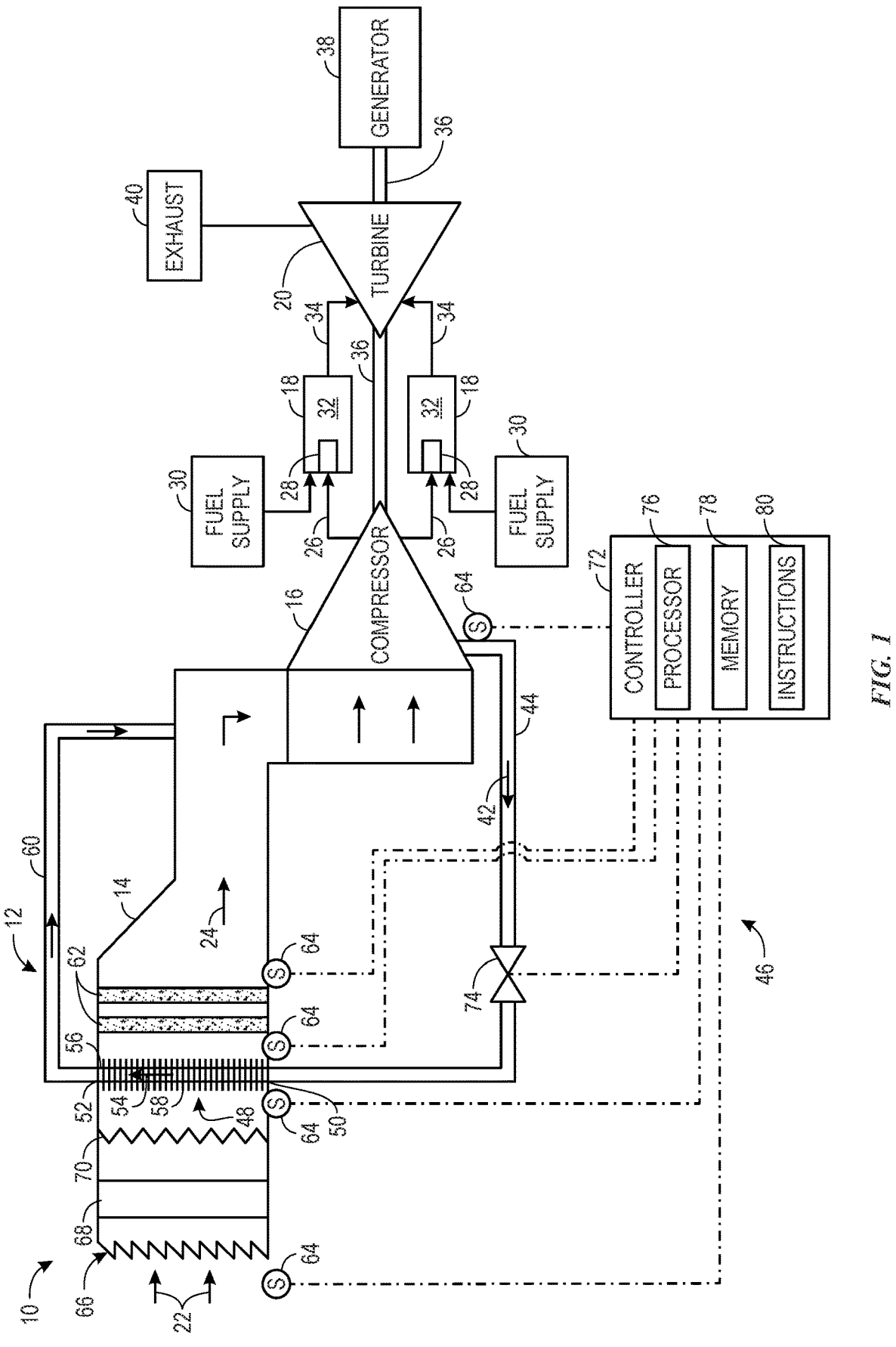
FIG. 1 is a block diagram of a gas turbine system having an air intake system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A gas turbine system receives an airflow (e.g., ambient airflow) through an air intake system, which directs the airflow to a compressor of the gas turbine system. The disclosed embodiments relate to an anti-icing system that is configured to block a buildup of ice on a filter within the air intake system. The anti-icing system includes one or more finned conduits configured to heat the airflow via convection in order to form a heated airflow that increases a temperature adjacent to the filter within the air intake system and that blocks the buildup of ice on the filter within the air intake system. Each of the finned conduits includes a heated fluid conduit defining a flowpath extending along an axis of the heated fluid conduit, and a plurality of fins spaced along the conduit and extending radially outward from the conduit relative to the axis of the conduit. The finned conduit is configured to be installed in an air intake conduit of the gas turbine system, to receive a heated fluid flowing along the flowpath, and to transfer heat from the heated fluid to the airflow through the air intake system of the gas turbine system. The anti-icing system may also include a bleed conduit for directing a flow of heated fluid extracted from the compressor toward the air intake of the gas turbine system. The bleed conduit may include a valve, which may be controlled by a controller, to control the flow of heated fluid through the bleed conduit. An intake manifold may receive a flow of heated fluid and distribute the flow of heated fluid to multiple finned conduits. Further, an exhaust manifold may receive multiple flows of heated fluid from the multiple finned conduits and combine the multiple flows into a single flow of heated fluid through a bypass conduit. The bypass conduit may be configured to inject the heated fluid into the air intake conduit, downstream of the filters to further heat the airflow after it passes through the filters.

While the anti-icing system is generally described as being used during cold ambient conditions to heat the airflow and the heated fluid to increase the temperature of the airflow (e.g., to turn the airflow using the heated airflow for anti-icing functionality), to facilitate discussion, it should be appreciated that the anti-icing system may be more generally referred to as an inlet bleed heat (IBH) system and may also advantageously exchange heat between the airflow and the heated fluid in a manner that blocks extremely high temperatures (e.g., hot spots that exceed a high temperature limit for the filter) at the filter of the air intake system during other conditions (e.g., hot ambient conditions and/or IBH maximum flow conditions). Thus, the anti-icing system may also protect the filter from the extremely high temperatures that may otherwise result in early degradation of material of the filter and/or damage (e.g., burn) to the material of the filter.

For example, the anti-icing system may heat the airflow such that at least 55 percent (or at least 60, 70, 80, 90, or 95 percent) of the face of the filter is heated by the heated airflow having a respective temperature that is at least 2 degrees Celsius (or at least 3, 4, or 5 degrees Celsius) greater than a dew point temperature of the air, and the anti-icing system may also exchange heat between the airflow and the heated fluid such that less than 50 percent (or less than 40, 30, 20, 10, or 5 percent) of the face of the filter is heated to the extremely high temperatures (e.g., hot spots of more than 75 or 80 degrees Celsius extend across less than 50 percent of the filter face of the filter or are completely eliminated).

Furthermore, the anti-icing system generally provides better mixing, which provides a positive impact on the compressor by reducing thermal distortion of the heated airflow at an inlet of the compressor. It should be appreciated that the anti-icing system disclosed herein may be used in additional operating conditions, such as at non-icing temperatures and gas turbine base load with the anti-icing system inactivated (e.g., turned off). In such cases, the structural components of the anti-icing system (e.g., finned conduits) may generate a pressure loss that is not significantly greater than systems without such structural components.

Turning now to the drawings, FIG. 1 is a block diagram of an embodiment of a gas turbine system 10 (e.g., gas turbine engine). The gas turbine system 10 includes an air intake system 12 having an air intake conduit 14 (e.g., housing). The gas turbine system 10 also includes a compressor 16, one or more combustors 18, and a turbine 20 (e.g., an expansion turbine). The gas turbine system 10 intakes an airflow 22 (e.g., ambient air) into the air intake system 12, heats the airflow 22 form a heated airflow 24, compresses the heated airflow 24 through the compressor 16 to form a compressed airflow 26, and combusts a fuel with the compressed airflow 26 in the one or more combustors 18. Each combustor 18 has one or more fuel nozzles 28 configured to inject a liquid fuel and/or a gaseous fuel (e.g., natural gas or syngas) from one or more fuel supplies 30 into a combustion chamber 32. Although not shown, in some embodiments, the fuel nozzles 28 may include primary and secondary fuel nozzles that inject fuel at a primary fuel injection zone and a secondary fuel injection zone, respectively.

Each combustor 18 combusts the fuel injected by the fuel nozzles 28 with the compressed airflow 26 to create hot, pressurized combustion gases 34, which is directed into the turbine 20. The turbine 20 has turbine blades coupled to a shaft 36, which is coupled to a load, such as an electric generator 38. As the combustion gases 34 flow into and through the turbine 20, the combustion gases 34 drive rotation of the turbine blades and the shaft 36, thereby driving the electric generator 38. In some embodiments, the shaft 36 may be connected to another load, such as machinery, a propeller of an aircraft or ship, or a compressor. Eventually, the combustion gases 34 exit the gas turbine system 10 as exhaust gases via an exhaust section 40 (e.g., an exhaust diffuser, an exhaust duct, an exhaust stack or tower, an emissions control system such as a selective catalytic reduction (SCR) system, etc.). In the illustrated embodiment, the shaft 36 is coupled to a compressor shaft of the compressor 16, which has compressor blades coupled to the compressor shaft in one or more stages (e.g., 1 to 30 stages in different axial positions). The rotation of the compressor blades within the compressor 16 causes compression of the airflow 24 from the air intake system 12.

Furthermore, the gas turbine system 10 also extracts or bleeds a portion of the compressed airflow (e.g., the heated fluid or a heated fluid flow, as indicated by arrow 42) from the compressor 16 through an extraction or bleed conduit 44 to an anti-icing system 46 (e.g., an inlet bleed heat (IBH) system). In particular, the anti-icing system 46 includes multiple finned conduits 48 (e.g., finned pipes; finned tubes), a first manifold 50 (e.g., an intake manifold) and a second manifold 52 (e.g., an exhaust manifold). The heated fluid from the bleed conduit 44 is provided into the first manifold 50, which delivers the heated fluid to the multiple finned conduits 48, which heat the airflow 22 as the airflow 22 flows by the multiple finned conduits 48 to form the heated airflow 24.

Each of the multiple finned conduits 48 defines one or more flow paths 54 (e.g., defined by a pipe, tube, or other conduit 56) extending axially through the conduit 48 and/or along an axis of the conduit 48, and a plurality of fins 58 spaced along the conduit 48 in an axial direction, orthogonal to the axis, and extending radially outward from the conduit 56, such that a direction of the flow path 54 is orthogonal to a plane of the fins 58. The heated fluid from the bleed conduit 44 flows through the first manifold 50 and into one of the multiple finned conduits 48. As the heated fluid flows through the finned conduit 48, heat is drawn from the heated fluid into the finned conduit 48 and the fins 58. The fins 58 act as heat sinks to transfer heat into the airflow 22 as the airflow 22 flows by the finned conduit 48. Accordingly, heat from the heated fluid flows through the walls of the conduit 56, into the fins 58, and then into the airflow 22 as the airflow 22 flows past the finned conduit 48, resulting in the heated airflow 24. The heated fluid flows out of the finned conduit 48 through the second manifold 52 and into a bypass conduit 60 that directs the heated fluid into the air intake conduit 14, downstream of one or more filters 62 (e.g., first stage and second stage filters), to further heat the heated airflow 24 after it has passed through the filters 62.

Thus, the inti-icing system 46 operates to evenly heat the airflow 22 to reduce or eliminate a buildup of ice on the filter 62 and/or to generally maintain the heated airflow 24 at a temperature that is within a specified range across a face of the filter 62 (e.g., across all or most of the face of the filter 62) to enable proper operation of the air intake system 12 and to provide satisfactory performance of the gas turbine system 10.

The bleed conduit 44 may be one or more bleed conduits that are coupled to the compressor 16 at or downstream from each, some, or one of the one or more compressor stages. The compressor 16 increases the pressure and temperature of the compressed airflow 26 with each subsequent compressor stage, and thus the bleed conduit 44 may extract the compressed airflow 26 at a particular compressor stage with a suitable pressure and temperature for use in the anti-icing system 46. In certain embodiments, the anti-icing system 46 may selectively extract the compressed airflow 26 (e.g., as the heated fluid, as indicated by arrow 42) through the bleed conduit 44 based on a temperature (e.g., monitored by one or more sensors 64, labeled "S" in FIG. 1) of the airflow 22 entering the air intake system 12, a temperature of the heated airflow 24 at the one or more filters 62, and/or a temperature of the heated airflow 24 at the compressor 16. For example, with a progressively lower ambient temperature, the anti-icing system 46 may extract the compressed airflow 26, 42 through a greater number of bleed conduits 44 and/or through bleed conduits 44 at progressively later compressor stages of the compressor 16.

In operation, the air intake system 12 receives the airflow 22 through an air hood 66 coupled to the air intake conduit 14. In some embodiments, the airflow 22 may pass through or across one or more additional air intake components, such as multiple silencer baffles 68, one or more coalescers 70, the multiple finned conduits 48, the first and second manifolds 50, 52, and the one or more filters 62.

As noted above, the anti-icing system 46 also includes multiple sensors 64 that are configured to monitor operational conditions, such as the temperature, humidity, or various conditions conducive to ice formation. For example, the anti-icing system 46 may include one or more sensors 64 positioned at or outside of the air hood 66 to thereby monitor ambient conditions of the air (e.g., ambient temperature, humidity, etc.). The anti-icing system 46 may include one or more sensors 64 positioned at or upstream of the first and/or second manifolds 50, 52. The anti-icing system 46 also may include one or more sensors 64 positioned at or downstream from the first and/or second manifolds 50, 52, such as at one or more of the filters 62, or axially between the first and/or second manifolds 50, 52 and one of the filters 62. Furthermore, the anti-icing system 46 may include one or more sensors 64 positioned downstream of one of the filters 62, such as at or upstream of the inlet of the compressor 16. The anti-icing system 46 also may include one or more sensors 64 disposed along each of the bleed conduits 44 and/or the bypass conduit 60.

The anti-icing system 46 also includes a controller 72 communicatively coupled to the sensors 64, a valve 74 disposed along each bleed conduit 44, and various components of the gas turbine system 10 (e.g., valves that control a supply of the fuel from the fuel supply 30 to the fuel nozzles 28). The controller 72 has processing circuitry (e.g., one or more processors 76), a memory 78, and computer-readable instructions 80 stored on the memory 78 and executable by the processor 76. The controller 72 obtains sensor readings from the sensors 64, and the controller 72 may use the computer-readable instructions 80 to regulate the operation of the anti-icing system 46 based on these sensor readings, upper and lower thresholds for temperature (e.g., desirable limits or targets), computer models, and/or user input.

For example, if the temperature at one or more of the sensors 64 falls below a lower temperature threshold (e.g., 0 degrees Celsius, the dew point of the ambient air, some other some threshold temperature above the dew point of the ambient air, etc.), then the controller 72 may send a control signal to an actuator (e.g., an electric actuator) of the valve 74 to partially or entirely open the valve 74 to enable a flow of the heated fluid to pass through the bleed conduit 44 to the first manifold 50.

Correspondingly, if the temperature at one or more of the sensors 64 exceeds an upper temperature threshold (e.g., a maximum temperature of air that can flow through the filters 62 without damaging the filters 62, some other threshold temperature below the maximum temperature of air that can flow through the filters 62 without damaging the filters 62, etc.), then the controller 72 may send a control signal to the actuator of the valve 74 to partially or entirely close the valve 74 to slow or stop the flow of the heated fluid through the bleed conduit 44 to the first manifold 50. Although FIG. 1 illustrates the compressed airflow from the compressor 16 as the heated fluid supplied to the first manifold 50, certain embodiments of the anti-icing system 46 may be additionally or alternatively coupled to one or more other sources of heated fluid (e.g., other sources of heated airflow, exhaust gas).

In this way, the controller 72 may monitor the anti-icing system 46 and control the flowrate and/or the temperature of the heated fluid into the first manifold 50 and through the finned conduit 48, thereby adjusting the temperature in the air intake conduit 14 to inhibit and/or remove ice formation on the filters 62 or elsewhere in the air intake system 12 and/or in the compressor 16, and/or excessive heating of the filters 62. As discussed in more detail below, the finned conduit 48 transfers heat from the heated fluid flowing through the bleed conduit to the airflow 22 to thereby adjust the temperature of the heated airflow 24 and/or to make the temperature of the heated airflow 24 more uniform within a region of the air intake conduit 14 downstream of the multiple finned conduits 48 (e.g., between the multiple finned conduits 48 and the filters 62, and particularly across a face of the filters 62).

Figure 2:
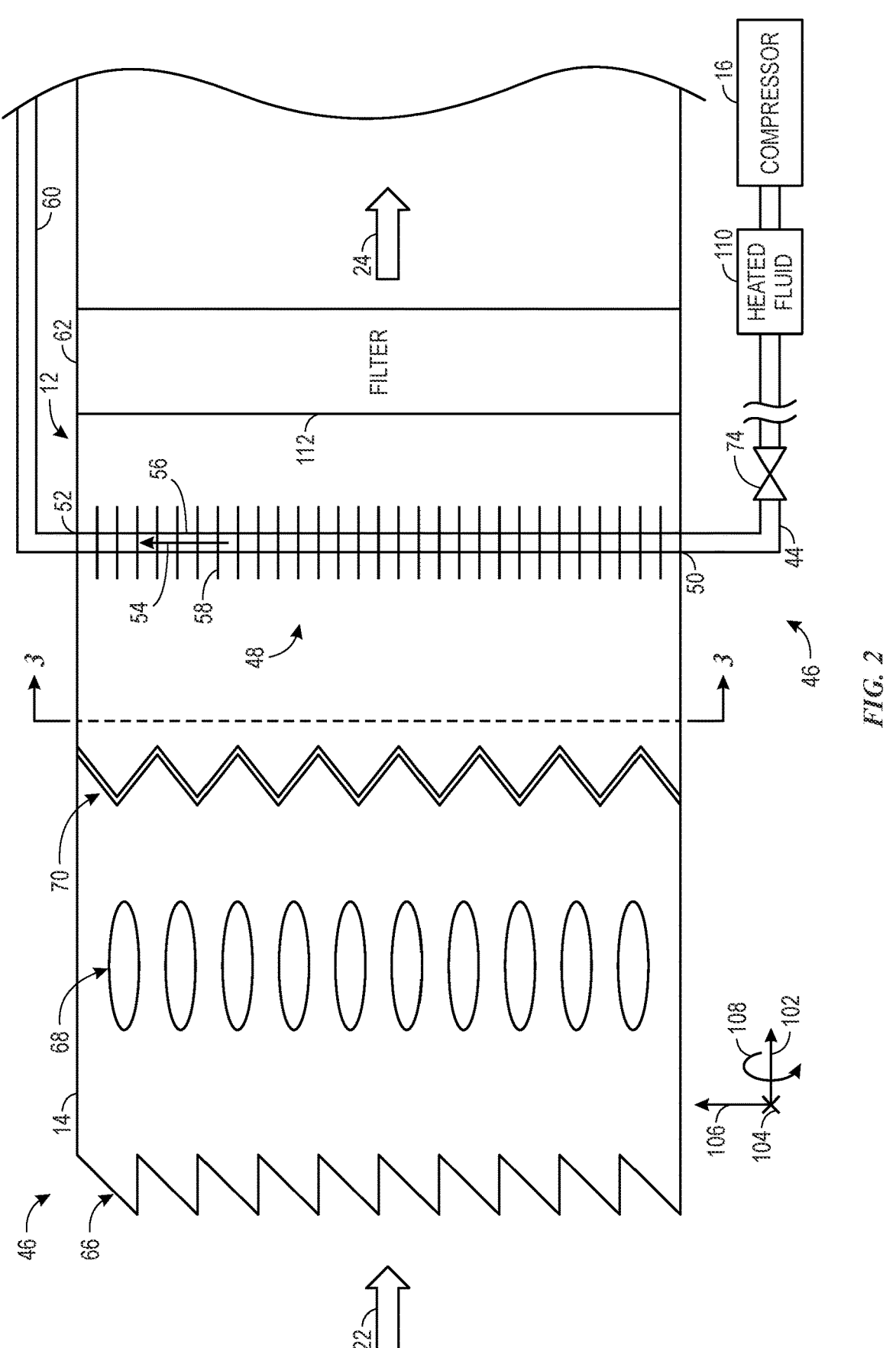
FIG. 2 is a schematic of a portion of an anti-icing system that may be used in the air intake system of FIG. 1, in accordance with an embodiment.

FIG. 2 is a schematic of an embodiment of the anti-icing system 46 coupled to the air intake system 12. To facilitate discussion, the anti-icing system 46 and the air intake system 12 may be described with reference to a longitudinal axis or axial direction 102, a lateral axis or direction 104, a vertical axis or radial direction 106, and/or a circumferential axis or circumferential direction 108.

As shown, the anti-icing system 46 includes the one or more finned conduits 48, which may be oriented along the vertical axis/direction 106 or the lateral axis/direction 104, the first manifold 50, and the second manifold 52. The airflow 22 enters the air intake system 12 through the air hood 66, which may include multiple angled baffles to block entry of rain or snow. The airflow 22 may also pass through multiple silencer baffles 68 and/or coalescers 70 upstream of the finned conduits 48. The silencer baffles 68 have one or more acoustic attenuation features (e.g., acoustic attenuation surface features, internal material) to help reduce acoustic noise caused by the airflow 22 passing through the air intake system 12. The coalescers 70 are configured to remove water from the airflow 22. The coalescers 70 may include mechanical coalescers, electrostatic coalescers, or a combination thereof.

After the airflow 22 passes by, and is heated by, the finned conduits 48 to form the heated airflow 24, the heated airflow 24 may then pass through the one or more filters 62. The one or more filters 62 may include any number and type of filters. Each of the one or more filters 62 may be configured to filter particulate and moisture. However, each filter 62 may be susceptible to ice formation at certain low temperatures and/or heat damage at certain high temperatures. Although the above components are illustrated in a sequence (e.g., upstream to downstream) in the air intake conduit 14, various embodiments may rearrange each of the foregoing components in any suitable order, except that the finned conduits 48 remain upstream from the one or more filters 62.

As shown, heated fluid 110 extracted from the compressor 16 flows through the bleed conduit 44 of the anti-icing system 46. The compressor extraction may be 1%, 2%, 3%, 4%, 5%, 6%, 7%, 8%, 9%, 10%, 12%, 15%, 20%, or any other percentage of the total airflow 22 into the compressor 16, regardless of the load of the gas turbine system 10 and the ambient conditions. By way of example, a typical compressor extraction may be 6% at a gas turbine load of 80% on a cold day, and the same compressor extraction percentage (6%) may also be used at a gas turbine load of 30% on a hot day. Thus, the % flow through the bleed conduit 44 is calculated with respect to the compressor flow at a given operating condition, which itself may vary with load and with ambient conditions.

Figure 3:
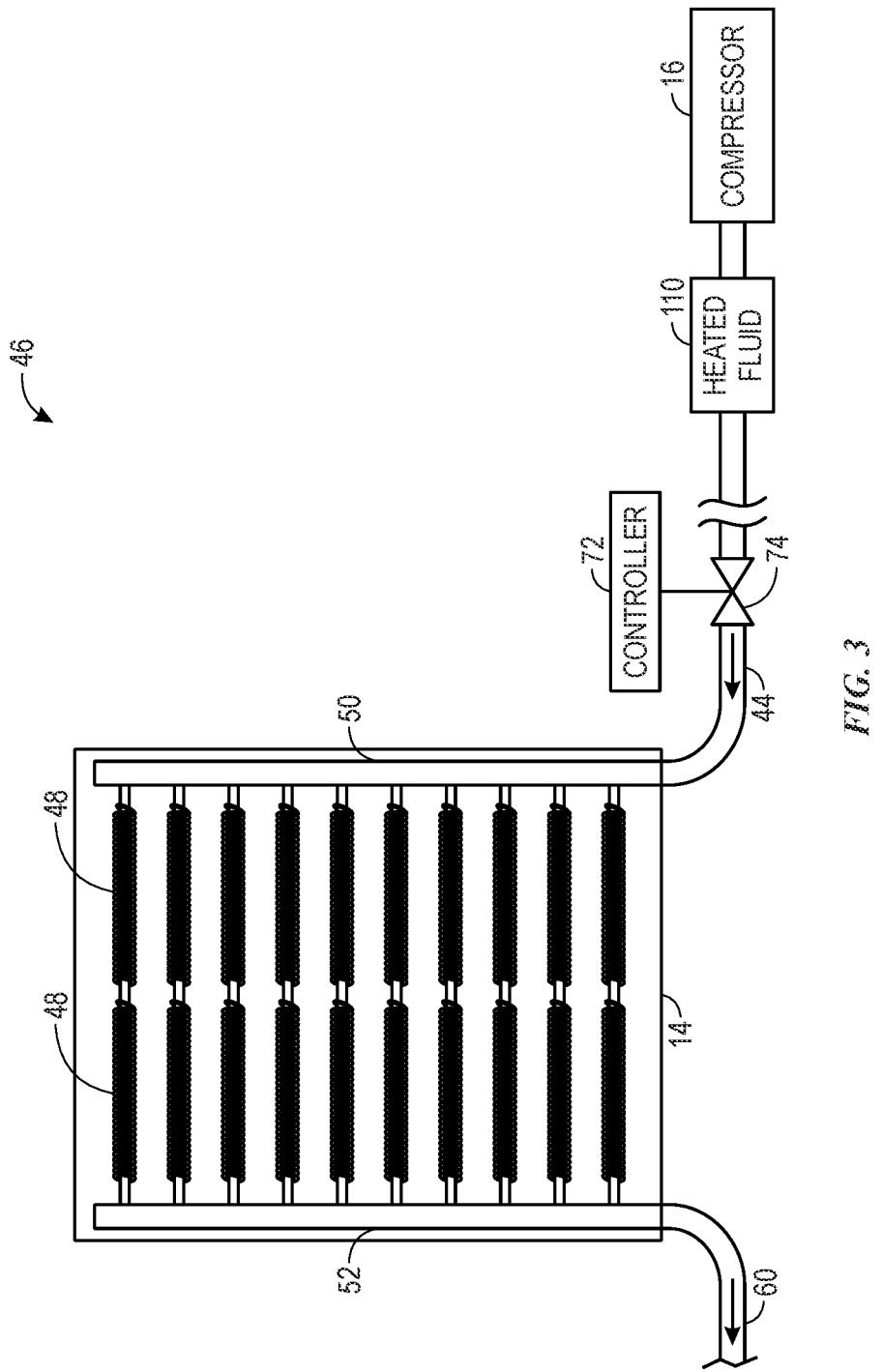
FIG. 3 is a schematic of the anti-icing system of FIG. 2 taken across an air intake conduit as indicated by line 3-3 of FIG. 2, in accordance with an embodiment.

In some embodiments, the valve 74 may control the flow of heated fluid 110 through the bleed conduit 44 and into the one or more finned conduits 48 via the first manifold 50. In some embodiments, as shown and described with regard to FIG. 1, the valve 74 may be controlled by the controller 72. The first manifold 50 may receive a flow of the heated fluid 110 from the bleed conduit 44 and direct the heated fluid 110 into one or more finned conduits 48 by separating the flow of heated fluid 110 into one or more respective flows and then directing each of the one or more respective flows of heated fluid 110 into one or more finned conduits 48, as shown in FIG. 3. For example, a particular flow of heated fluid 110 may flow through one or more finned conduits 48 between the first manifold 50 and the second manifold 52. Accordingly, the anti-icing system 46 may include multiple finned conduits 48 disposed between the first manifold 50 and the second manifold 52 such that the anti-icing system 46 may include multiple parallel flow paths of heated fluid 110, and each of the parallel flow paths may flow through a single finned conduit 48 or multiple finned conduits 48 arranged in series, in parallel, or some combination thereof.

As previously described, each finned conduit 48 includes a conduit 56 defining a flow path 54 in fluid communication with the bleed conduit 44 via the first manifold 50. Accordingly, the heated fluid 110 flows through the conduit 56 along the flow path 54 (e.g., in the vertical direction 106 or the lateral direction 104). The finned conduit 48 also includes multiple fins 58. As previously described, as the heated fluid 110 flows through the conduit 56 of the finned conduit 48, heat may be transferred from the heated fluid 110 to the conduit 56 via convection. The heat may then be further transferred from the conduit 56 to the fins 58 via conduction. As the airflow 22 flows through the air intake conduit 14, the airflow 22 flows around the finned conduit 48. For example, portions of the airflow 22 may flow between fins 58 of the finned conduit 48. As the airflow 22 flows by fins 58 of the finned conduit 48, heat may be transferred from the fins 58 to the airflow 22 via convection, resulting in the heated airflow 24.

In some embodiments, the flow of heated fluid 110 through the multiple finned conduits 48 may be controlled via the valve 74 to achieve a desired set of conditions of the heated airflow 24. For example, the operator may wish for the temperature of the heated airflow 24 to fall within a desired temperature range. In such an embodiment, the lower bounds of the desired temperature range may be a temperature that is sufficiently high to reduce or eliminate icing on a face 112 of the filter 62. Such a lower bounds temperature may be an absolute temperature or a temperature determined based on the dew point of the airflow. For example, the lower bounds of the desired temperature range may be at (equal to) the dew point of the airflow, 1 degree Celsius above the dew point, 2 degrees Celsius above the dew point, 3 degrees Celsius above the dew point, 4 degrees Celsius above the dew point, 5 degrees Celsius above the dew point, 6 degrees Celsius above the dew point, 7 degrees Celsius above the dew point, 8 degrees Celsius above the dew point, 9 degrees Celsius above the dew point, 10 degrees Celsius above the dew point, 11 degrees Celsius above the dew point, 12 degrees Celsius above the dew point, 13 degrees Celsius above the dew point, 14 degrees Celsius above the dew point, 15 degrees Celsius above the dew point, 16 degrees Celsius above the dew point, 17 degrees Celsius above the dew point, 18 degrees Celsius above the dew point, 19 degrees Celsius above the dew point, 20 degrees Celsius above the dew point, 25 degrees Celsius above the dew point, 30 degrees Celsius above the dew point, 35 degrees Celsius above the dew point, 40 degrees Celsius above the dew point, or any other temperature.

The upper bounds of the desired temperature range may be a temperature that is not sufficiently high as to cause or induce melting on the face 112 of the filter 62 or other damage to the filter. Such an upper bounds temperature may be an absolute temperature, such as 65 degrees Celsius, 66 degrees Celsius, 67 degrees Celsius, 68 degrees Celsius, 69 degrees Celsius, 70 degrees Celsius, 71 degrees Celsius, 72 degrees Celsius, 73 degrees Celsius, 74 degrees Celsius, 75 degrees Celsius, 76 degrees Celsius, 77 degrees Celsius, 78 degrees Celsius, 79 degrees Celsius, 80 degrees Celsius, 81 degrees Celsius, 82 degrees Celsius, 83 degrees Celsius, 84 degrees Celsius, 85 degrees Celsius, 86 degrees Celsius, 87 degrees Celsius, 88 degrees Celsius, 89 degrees Celsius, 90 degrees Celsius, or any other temperature.

Further, the multiple finned conduits 48 may be arranged, and the flow of heated fluid 110 through the multiple finned conduits 48 may be controlled via the valve 74, to achieve a temperature uniformity of 50%, 51%, 52%, 53%, 54%, 55%, 56%, 57%, 58%, 59%, 60%, 61%, 62%, 63%, 64%, 65%, or any other number. As used herein, "temperature uniformity" refers to a temperature distribution over a prescribed (typically small) range at or near a face 112 of the filter 62. To achieve such results, the multiple finned conduits 48 may occupy a set percentage of a cross-sectional area of the air intake conduit 14 and/or a cross-sectional area of the face 112 of the filter 62. For example, the multiple finned conduits 48 may occupy 50%, 51%, 52%, 53%, 54%, 55%, 56%, 57%, 58%, 59%, 60%, or any other percentage of the cross-sectional area of the air intake conduit 14 and/or the cross-sectional area of the face 112 of the filter 62, which does not create an unacceptably large pressure drop in the airflow while still enabling the desired temperature rise and uniformity.

The fins 58 of the multiple finned conduits 48 may be the same size and shape across a single finned conduit 48 or across all of the multiple finned conduits 48. However, in some embodiments, the size and/or shape of the fins may vary across the length of a particular finned conduit 48 and/or may vary from one finned conduit 48 to another finned conduit 48. In some embodiments, the fins 58 may be planar (e.g., flat), whereas in other embodiments, the fins may vary (e.g., have the profile of a sine wave, another curved profile, or some other function) along one, two, or three dimensions. In some embodiments, the fins 58 may extend parallel to one another, whereas in other dimensions, the fins 58 may not be parallel to one another. Embodiments are envisaged in which the fins 58 are the shapes of one or more of a circle, an ellipse, a square, a rectangle, a rhombus, a parallelogram, a trapezoid, a pentagon, a hexagon, a heptagon, and octagon, or any other polygon.

As shown in FIG. 2, the multiple finned conduits 48 may be disposed upstream of the filter 62 with respect to the airflow (e.g., in direction 102). For example, the multiple finned conduits 48 may be disposed within 4 meters of the filter 62, 3 meters of the filter 62, 2 meters of the filter 62, 1 meter of the filter 62, 0.5 meters of the filter 62, 0.25 meters of the filter 62, or some other distance from the filter 62. In embodiments with more than one filter, such distances are intended to refer to the distance between the multiple finned conduits and the closest (i.e., most upstream) filter.

As shown in FIGS. 2 and 3, heated fluid 110 flows from the multiple finned conduits 48 into the second manifold 52, which combines the flows from the multiple finned conduits 48 into a single flow and directs the flow of heated fluid 110 into the bypass conduit 60. Though not shown in FIG. 2, the heated fluid 110 flowing through the bypass conduit 60 is injected into the air intake conduit downstream of the filters 62, which may further heat the heated airflow 24. Accordingly, the anti-icing system 46 may be configured to partially heat the airflow 22 upstream of the filters 62 and then further heat the heated airflow 24 downstream of the filters 62. Accordingly, anti-icing system 46 may be operated to heat the airflow 22 to achieve the heated airflow 24 having the set of the desirable characteristics, so as to reduce and/or eliminate icing on the face 112 of the filter 62, but also to reduce and/or eliminate melting and/or other damage to the filter 62, and also to allow additional heating of the airflow downstream of the filters 62. For example, by controlling the flowrate of heated fluid 110 through the multiple finned conduits 48 using the valve 74, the heating of the airflow 22 upstream and downstream of the filters 62 may be controlled.

In the illustrated embodiment, the heated fluid 110 includes the compressed airflow extracted from the compressor 16, as discussed above with reference to FIG. 1. The compressed air extracted from the compressor 16 may be approximately 200 to 600 degrees Celsius, having approximate pressures of 800 to 900 Kilopascals. However, the anti-icing system 46 may directly or indirectly use any one or more heated fluids to elevate the temperature of the airflow 22. For example, as illustrated, the heated fluid 110 may be any suitable heated fluid that can be directed through the finned conduit 48 to elevate the temperature of the airflow 22, including, but not limited to, a heated air or exhaust gas.

FIG. 3 is a schematic illustration of the anti-icing system 46 taken across the air intake conduit 14 as indicated by line 3-3 of FIG. 2, illustrating the first and second manifolds 50, 52 and the finned conduits 48 positioned across the flow path in the air intake conduit 14 in accordance with an embodiment. Each of the multiple finned conduits 48 may be mechanically and fluidly coupled to the first and second manifolds 50, 52 and/or one or more other finned conduits 48 either directly or indirectly via one or more spacer fittings configured to couple finned conduits 48 to one another or to one or both manifolds 50, 52.

In the illustrated embodiment, the finned conduits 48 are arranged parallel (or substantially parallel) to one another with a uniform spacing between adjacent finned conduits 48. In some embodiments, a row of finned conduits 48 extending between the first and second manifolds 50, 52 may include multiple finned conduits 48 in series and/or in parallel. To achieve a desired amount of heating and uniformity in heating, the multiple finned conduits 48 may occupy a set percentage of a cross-sectional area of the air intake conduit 14. For example, the multiple finned conduits 48 may occupy 50%, 51%, 52%, 53%, 54%, 55%, 56%, 57%, 58%, 59%, 60%, or any other percentage of the cross-sectional area of the air intake conduit 14, which does not create an unacceptably large pressure drop in the airflow while still enabling the desired temperature rise and uniformity.

As previously described, heated fluid 110 is extracted from the compressor 16 and flows through the bleed conduit 44 of the anti-icing system 46. The compressor extraction may be 1%, 2%, 3%, 4%, 5%, 6%, 7%, 8%, 9%, 10%, 12%, 15%, 20%, or any other percentage of the total airflow 22 into the compressor 16 at the operating condition of the gas turbine system 10. The valve 74 may be operated via the controller 75 to control the flow of heated fluid 110 through the bleed conduit 44 and into the first manifold 50. The first manifold 50 receives a flow of the heated fluid 110 from the bleed conduit 44 and directs the heated fluid 110 into one or more finned conduits 48 by separating the flow of heated fluid 110 into one or more respective flows and then directing each of the one or more respective flows of heated fluid 110 into one or more finned conduits 48. As shown in FIG. 3, the anti-icing system 46 may include multiple finned conduits 48 disposed between the first manifold 50 and the second manifold 52 such that the anti-icing system 46 may include multiple parallel flow paths of heated fluid 110. Each of the parallel flow paths may flow through a single finned conduit 48 or multiple finned conduits 48 arranged in series, in parallel, or some combination thereof.

Each finned conduit 48 includes a respective conduit defining a flow path in fluid communication with the bleed conduit 44 via the first manifold 50. Accordingly, the heated fluid 110 flows through the conduit along the flow path. The finned conduit 48 also includes multiple fins such that, as the heated fluid 110 flows through the conduit 56 of the finned conduit 48, heat may be transferred from the heated fluid 110 to the conduit 56 via convection. The heat may then be further transferred from the conduit 56 to the fins 58 via conduction. As the airflow flows through the air intake conduit 14, the airflow flows around/between the finned conduits 48 such that heat may be transferred from the fins 58 of the finned conduits 48 to the airflow 22 via convection, resulting in the heated airflow 24. The flow of heated fluid 110 through the multiple finned conduits 48 may be controlled by the controller 72 via the valve 74 to achieve the desired set of conditions of the heated airflow.

The heated fluid 110 flows from the multiple finned conduits 48 into the second manifold 52, which combines the flows from the multiple finned conduits 48 into a single flow and directs the flow of heated fluid 110 into the bypass conduit 60. Though not shown in FIG. 3, the heated fluid 110 flowing through the bypass conduit 60 is injected into the air intake conduit downstream of the filters 62, which may further heat the heated airflow. (See FIG. 1.) Accordingly, anti-icing system 46 may be operated to heat the airflow to achieve the heated airflow 24 having the set of the desirable characteristics, so as to reduce and/or eliminate icing at the filter(s) 62, but also reduce and/or eliminate melting and/or other damage to the filter(s) 62, while also allowing additional heating of the airflow downstream of the filter(s) 62.

Figure 4:
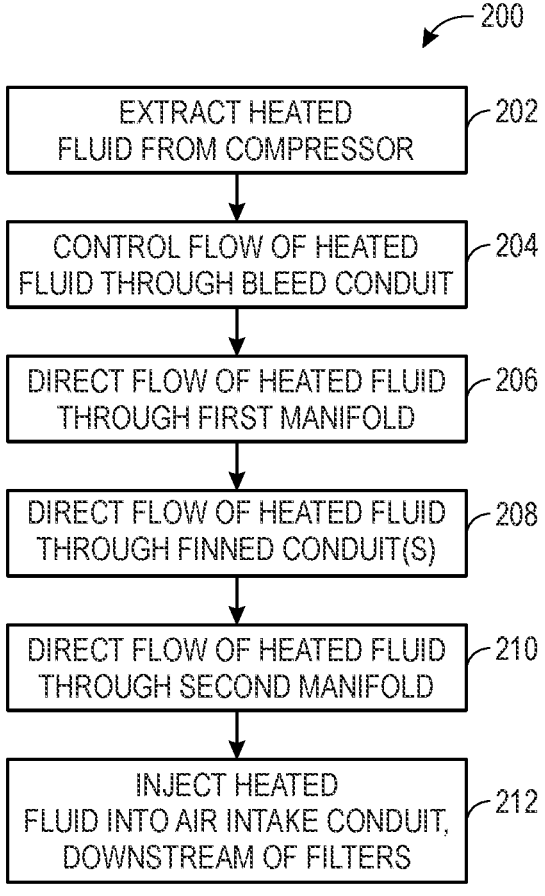
FIG. 4 is a flow chart of a process for operating the inti-icing system of FIGS. 1-3, in accordance with an embodiment.

FIG. 4 is a flow chart of a process 200 for operating the inti-icing system 46 shown in FIGS. 1-3. At block 202, heated fluid is extracted from the compressor. The compressor extraction may be 1%, 2%, 3%, 4%, 5%, 6%, 7%, 8%, 9%, 10%, 12%, 15%, 20%, or any other percentage of the total compressor airflow at the operating conditions of the gas turbine system 10. The compressed air extracted from the compressor may be approximately 200 to 600 degrees Celsius, having approximate pressures of 800 to 900 Kilopascals. However, one or more other heated fluids may also be utilized. For example, the heated fluid may include any suitable heated fluid that can be directed through the finned conduit to elevate the temperature of the airflow, including, but not limited to, a heated air from another source or exhaust gas.

At block 204, the heated fluid is directed through a bleed conduit, and the flow of the heated fluid through the bleed conduit is controlled. For example, the flow of the heated fluid through the bleed conduit may be controlled by the controller via one or more valves based on sensor readings. If the temperature at one or more of the sensors falls below a lower temperature threshold (e.g., 0 degrees Celsius, the dew point of the ambient air, or other some threshold temperature above the dew point of the ambient air, etc.), then the controller may send a control signal to an actuator (e.g., an electric actuator) of the valve to partially or entirely open the valve to enable a flow of the heated fluid to pass through the bleed conduit. Correspondingly, if the temperature at one or more of the sensors exceeds an upper temperature threshold (e.g., a maximum temperature of air that can flow through the filters without damaging the filters, some other threshold temperature below the maximum temperature of air that can flow through the filters without damaging the filters, etc.), then the controller may send a control signal to the actuator of the valve to partially or entirely close the valve to slow or stop the flow of the heated fluid through the bleed conduit.

For example, a desired temperature range may be provided for the heated airflow. In such an embodiment, the lower bounds of the desired temperature range may be a temperature that is sufficiently high to reduce or eliminate icing on a face of the filter. Such a lower bounds temperature may be an absolute temperature or a temperature determined based on the dew point of the airflow. For example, the lower bounds of the desired temperature range may be at (equal to) the dew point of the airflow, 1 degree Celsius above the dew point, 2 degrees Celsius above the dew point, 3 degrees Celsius above the dew point, 4 degrees Celsius above the dew point, 5 degrees Celsius above the dew point, 6 degrees Celsius above the dew point, 7 degrees Celsius above the dew point, 8 degrees Celsius above the dew point, 9 degrees Celsius above the dew point, 10 degrees Celsius above the dew point, 11 degrees Celsius above the dew point, 12 degrees Celsius above the dew point, 13 degrees Celsius above the dew point, 14 degrees Celsius above the dew point, 15 degrees Celsius above the dew point, 16 degrees Celsius above the dew point, 17 degrees Celsius above the dew point, 18 degrees Celsius above the dew point, 19 degrees Celsius above the dew point, 20 degrees Celsius above the dew point, 25 degrees Celsius above the dew point, 30 degrees Celsius above the dew point, 35 degrees Celsius above the dew point, 40 degrees Celsius above the dew point, or any other temperature.

The upper bounds of the desired temperature range may be a temperature that is not sufficiently high as to cause or induce melting on the face of the filter or other damage to the filter. Such an upper bounds temperature may be an absolute temperature, such as 65 degrees Celsius, 66 degrees Celsius, 67 degrees Celsius, 68 degrees Celsius, 69 degrees Celsius, 70 degrees Celsius, 71 degrees Celsius, 72 degrees Celsius, 73 degrees Celsius, 74 degrees Celsius, 75 degrees Celsius, 76 degrees Celsius, 77 degrees Celsius, 78 degrees Celsius, 79 degrees Celsius, 80 degrees Celsius, 81 degrees Celsius, 82 degrees Celsius, 83 degrees Celsius, 84 degrees Celsius, 85 degrees Celsius, 86 degrees Celsius, 87 degrees Celsius, 88 degrees Celsius, 89 degrees Celsius, 90 degrees Celsius, or any other temperature.

At block 206, the flow of heated fluid is directed through the first manifold. The first manifold receives the flow of heated fluid from the bleed conduit. The first manifold is configured to provide the heated fluid to one or more finned conduits (e.g., by being in fluid communication with each of the one or more finned conduits). In embodiments having multiple finned conduits, the manifold may separate the flow of heated fluid into multiple flows of heated fluid and then provide (block 208) those multiple flows of heated fluid to the multiple finned conduits.

At block 208, the flow of heated fluid is directed through one or more finned conduits. Each of the finned conduits defines one or more flow paths (e.g., defined by a pipe, tube, or other conduit) and a plurality of fins extending outwardly from the conduit. As the heated fluid flows through the finned conduit, heat is drawn from the heated fluid into the finned conduit. The fins act as heat sinks to transfer heat into the airflow as the airflow flows through, around, and/or by the finned conduit. Accordingly, heat from the heated fluid flows through the walls of the conduit, into the fins, and then into the airflow as the airflow flows past the finned conduit, resulting in the heated airflow.

The multiple finned conduits may be arranged, and the flow of heated fluid through the multiple finned conduits may be controlled, to achieve a temperature uniformity of 50%, 51% 52%, 53%, 54%, 55%, 56%, 57%, 58%, 59%, 60%, 61%, 62%, 63%, 64%, 65%, or any other number at or near a face of a filter. To achieve such results, the multiple finned conduits may occupy a set percentage of a cross-sectional area of the air intake conduit and/or a cross-sectional area of the face of the filter. For example, the multiple finned conduits may occupy 50%, 51%, 52%, 53%, 54%, 55%, 56%, 57%, 58%, 59%, 60%, or any other percentage of the cross-sectional area of the air intake conduit and/or the cross-sectional area of the face of the filter, which does not create an unacceptably large pressure drop in the airflow while still enabling the desired temperature rise and uniformity.

The fins of the multiple finned conduits may be the same size and shape across a single finned conduit or across all of the multiple finned conduits. However, in some embodiments, the size and/or shape of the fins may vary across the length of a particular finned conduit and/or may vary from finned conduit to finned conduit. In some embodiments, the fins may be planar (e.g., flat), whereas in other embodiments, the fins may vary (e.g., have the profile of a sine wave, another curved profile, or some other function) along one, two, or three dimensions. In some embodiments, the fins may extend parallel to one another, whereas in other dimensions, the fins may not be parallel to one another. Embodiments are envisaged in which the fins are the shapes of one or more of a circle, an ellipse, a square, a rectangle, a rhombus, a parallelogram, a trapezoid, a pentagon, a hexagon, a heptagon, and octagon, or any other polygon.

Further, the multiple finned conduits may be disposed upstream of the filter with respect to the airflow through the compressor air intake system. For example, the multiple finned conduits may be disposed within 4 meters of the filter, 3 meters of the filter, 2 meters of the filter, 1 meter of the filter, 0.5 meters of the filter, 0.25 meters of the filter, or some other distance from the filter. In embodiments with more than one filter, such distances are intended to refer to the distance between the multiple finned conduits and the closest (i.e., most upstream) filter.

At block 210, the heated fluid is directed from the one or more finned conduits to the second manifold. The second manifold combines the flows from the multiple finned conduits into a single flow and directs the flow of heated fluid into the bypass conduit.

At block 212, the heated fluid is injected from the bypass conduit into the air intake conduit downstream of the filters. Injecting the heated fluid into the air intake conduit downstream of the filters may further heat the airflow downstream of the filters. Accordingly, the anti-icing system may be configured to partially heat the airflow upstream of the filters and then further heat the heated airflow downstream of the filters. Air from the air intake conduit subsequently flows into the compressor.

The present disclosure includes a gas turbine system that receives an airflow (e.g., ambient airflow) through an air intake system, which directs the airflow to a compressor of the gas turbine system. The disclosed embodiments relate to an anti-icing system that is configured to block a buildup of ice on a filter within the air intake system. The anti-icing system includes one or more finned conduits configured to heat the airflow via convection in order to form a heated airflow that increases a temperature adjacent to the filter within the air intake system and that blocks the buildup of ice on the filter within the air intake system. Each of the finned conduits includes a heated fluid conduit defining a flowpath extending along the heated fluid conduit and a plurality of fins spaced along the conduit and extending radially outward from the conduit. The finned conduit is configured to be installed in an air intake conduit of the gas turbine system, to receive a heated fluid flowing along the flowpath, and to transfer heat from the heated fluid to the airflow through the air intake system of the gas turbine system.

The anti-icing system may also include a bleed conduit for directing a flow of heated fluid extracted from the compressor toward the air intake of the gas turbine system. The bleed conduit may include a valve, which may be controlled by a controller, to control the flow of heated fluid through the bleed conduit. An intake manifold may receive a flow of heated fluid and distribute the flow of heated fluid to multiple finned conduits. Further, an exhaust manifold may receive multiple flows of heated fluid from the multiple finned conduits and combine the multiple flows into a single flow of heated fluid through a bypass conduit. The bypass conduit may be configured to inject the heated fluid into the air intake conduit downstream of the filters to further heat the airflow after it passes through the filters.

While the anti-icing system is generally described as being used during cold ambient conditions to heat the airflow using the heated fluid to increase the temperature of the airflow (e.g., to turn the airflow into the heated airflow for anti-icing functionality), it should be appreciated that the anti-icing system may be more generally referred to as an inlet bleed heat (IBH) system and may also advantageously exchange heat between the airflow and the heated fluid in a manner that blocks extremely high temperatures (e.g., hot spots that exceed a high temperature limit for the filter) at the filter of the air intake system during other conditions (e.g., hot ambient conditions and/or IBH maximum flow conditions). Thus, the anti-icing system may also protect the filter from the extremely high temperatures that may otherwise result in early degradation of material of the filter and/or damage (e.g., burn) to the material of the filter.

For example, the anti-icing system may heat the airflow such that at least 55 percent (or at least 60, 70, 80, 90, or 95 percent) of the face of the filter is heated by the heated airflow having a respective temperature that is at least 2 degrees Celsius (or at least 3, 4, or 5 degrees Celsius) greater than a dew point temperature of the air. The anti-icing system may also exchange heat between the airflow and the heated fluid such that less than 50 percent (or less than 40, 30, 20, 10, or 5 percent) of the face of the filter is heated to the extremely high temperatures (e.g., hot spots of more than 75 or 80 degrees Celsius extend across less than 50 percent of the filter face of the filter or are completely eliminated).

Furthermore, the anti-icing system generally provides better mixing, which provides a positive impact on the compressor by reducing thermal distortion of the heated airflow at an inlet of the compressor. It should be appreciated that the anti-icing system disclosed herein may be used in additional operating conditions, such as at non-icing temperatures and gas turbine base load with the anti-icing system inactivated (e.g., turned off). In such cases, the structural components of the anti-icing system (e.g., finned conduits) may generate a pressure loss that is comparable to and that is not significantly greater than systems without the structural components.

The technical effects of the anti-icing techniques disclosed herein include providing more effective heat transfer between the airflow and the heated fluid within the air intake system. Under certain conditions (e.g., cold ambient conditions), the mixing may result in more effective removal, reduction, and/or blocking of ice buildup on the filter of the air intake system of the gas turbine system as compared to traditional systems. Under certain conditions (e.g., hot ambient conditions and/or IBH maximum flow), the heat transfer may result in more effective reduction and/or blocking of hot spots on the filter of the air intake system of the gas turbine system as compared to traditional systems. The anti-icing assembly may also be cost-effective in that the components may be configured to fit within and/or interface with existing anti-icing systems and/or existing air intake systems (e.g., facilitating retrofit).

The subject matter described in detail above may be defined by one or more clauses, as set forth below.

An anti-icing system for a gas turbine system includes a finned conduit. The finned conduit includes a heated fluid conduit defining a flowpath extending in an axial direction along the heated fluid conduit and a plurality of fins spaced along the heated fluid conduit and extending radially outward from the heated fluid conduit. The finned conduit is configured to be installed in an air intake conduit of the gas turbine system, to receive a heated fluid flowing along the flowpath, and to transfer heat from the heated fluid to air flowing through the air intake conduit of the gas turbine system.

The anti-icing system of the preceding clause, including a plurality of finned conduits, including the finned conduit.

The anti-icing system of any preceding clause, including an intake manifold configured to receive the heated fluid and distribute the heated fluid to two or more of the plurality of finned conduits.

The anti-icing system of any preceding clause, including a valve configured to control a flow of the heated fluid into the intake manifold.

The anti-icing system of any preceding clause, including a controller configured to control operation of the valve.

The anti-icing system of any preceding clause, including an exhaust manifold configured to receive the heated fluid from two or more of the plurality of finned conduits and direct the heated fluid to a bypass conduit.

The anti-icing system of any preceding clause, wherein the bypass conduit is configured to inject the heated fluid into the air intake conduit of the gas turbine system downstream of the plurality of finned conduits and a filter with respect to the air flowing through the air intake conduit.

The anti-icing system of any preceding clause, wherein the heated fluid is extracted from a compressor of the gas turbine system.

The anti-icing system of any preceding clause, wherein the heated fluid is extracted from the compressor of the gas turbine system based on a compressor extraction of 6% of total compressor airflow.

The anti-icing system of any preceding clause, wherein each of the plurality of fins is planar.

The anti-icing system of any preceding clause, wherein each of the plurality of fins is of a shape projected along the axis of the heated fluid conduit that is circular, elliptical, square, rectangular, or any combination thereof.

The anti-icing system of any preceding clause, wherein the finned conduit is configured to heat the air flowing through the air intake conduit of the gas turbine system to a temperature greater than a first threshold temperature above a dew point of the air flowing through the air intake conduit of the gas turbine system.

The anti-icing system of any preceding clause, wherein the finned conduit is configured to heat the air flowing through the air intake conduit of the gas turbine system to a temperature less than a second threshold temperature.

A gas turbine system includes a compressor and an air intake system. The air intake system includes an air intake conduit, a filter system, and an anti-icing system. The air intake system is configured to supply a heated airflow to the compressor. The anti-icing system includes a plurality of finned conduits disposed within the air intake system, upstream of the filter system. Each of the finned conduits includes a heated fluid conduit defining a flowpath extending in an axial direction along the heated fluid conduit, and a plurality of fins spaced along the heated fluid conduit and extending radially outward from the heated fluid conduit.

Each of the plurality of finned conduits is configured to receive a heated fluid extracted from the compressor and flowing along the flowpath and to transfer heat from the heated fluid to air flowing through the air intake conduit of the gas turbine system.

The gas turbine system of the preceding clause, wherein the anti-icing system includes an intake manifold configured to receive the heated fluid and to distribute the heated fluid to two or more of the plurality of finned conduits, and an exhaust manifold configured to receive the heated fluid from two or more of the plurality of finned conduits and to direct the heated fluid to a bypass conduit.

The gas turbine system of any preceding clause, wherein the anti-icing system includes a valve configured to control a flow of the heated fluid into the intake manifold, and a controller configured to control operation of the valve.

The gas turbine system of any preceding clause, wherein the bypass conduit is configured to inject the heated fluid into the air intake conduit of the gas turbine system downstream of the plurality of finned conduits and the filter system with respect to the air flowing through the air intake conduit.

A method of operating an anti-icing system for a gas turbine system includes extracting a heated fluid from a compressor of the gas turbine system, directing the heated fluid through a heated fluid conduit of a finned conduit, wherein the finned conduit is disposed within an air intake conduit of the gas turbine system upstream of a filter with respect to air flowing through the air intake conduit; wherein the finned conduit comprises a plurality of fins spaced in an axial direction along the heated fluid conduit and extending radially outward from the heated fluid conduit, wherein the finned conduit is configured to transfer heat from the heated fluid to the air flowing through the air intake conduit of the gas turbine system, and injecting the heated fluid into the air intake conduit at a location downstream of the filter.

The method of the preceding clause, wherein the finned conduit is configured to heat the air flowing through the air intake conduit of the gas turbine system to a temperature that is greater than a threshold temperature above a dew point of the air flowing through the air intake conduit of the gas turbine system and less than a second threshold temperature.

The method of any preceding clause, including controlling a flow of the heated fluid through the heated fluid conduit such that the air flowing through the air intake conduit of the gas turbine system is heated to the temperature that is greater than the threshold temperature above the dew point of the air flowing through the air intake conduit of the gas turbine system and less than the second threshold temperature.

This written description uses examples to disclose the embodiments of the present disclosure, including the best mode, and also to enable any person skilled in the art to practice the embodiments of the present disclosure, including making and using any devices or systems and performing any incorporated methods. The patentable scope of the present disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An anti-icing system for a gas turbine system, the anti-icing system comprising:
a finned conduit comprising:

a heated fluid conduit defining a flowpath extending in an axial direction along the heated fluid conduit; and a plurality of fins spaced along the heated fluid conduit and extending radially outward from the heated fluid conduit;

wherein the finned conduit is configured to be installed in an air intake conduit of the gas turbine system, to receive a heated fluid flowing along the flowpath, and to transfer heat from the heated fluid to air flowing through the air intake conduit of the gas turbine system; and an exhaust manifold configured to receive the heated fluid from the finned conduit and to direct the heated fluid into the air intake conduit of the gas turbine system downstream of the finned conduit and a filter with respect to the air flowing through the air intake conduit.

2. The anti-icing system of claim 1, comprising a plurality of finned conduits, including the finned conduit.

3. The anti-icing system of claim 2, comprising an intake manifold configured to receive the heated fluid and distribute the heated fluid to two or more of the plurality of finned conduits.

4. The anti-icing system of claim 3, comprising a valve configured to control a flow of the heated fluid into the intake manifold.

5. The anti-icing system of claim 4, comprising a controller configured to control operation of the valve.

6. The anti-icing system of claim 2, wherein the exhaust manifold is configured to receive the heated fluid from two or more of the plurality of finned conduits and to direct the heated fluid to a bypass conduit.

7. The anti-icing system of claim 6, wherein the bypass conduit is configured to inject the heated fluid into the air intake conduit of the gas turbine system downstream of the plurality of finned conduits and the filter with respect to the air flowing through the air intake conduit.

8. The anti-icing system of claim 1, wherein the heated fluid is extracted from a compressor of the gas turbine system.

9. The anti-icing system of claim 8, wherein the heated fluid extracted from the compressor of the gas turbine system is equal to 6% of total compressor airflow.

10. The anti-icing system of claim 1, wherein each of the plurality of fins is planar.

11. The anti-icing system of claim 10, wherein each of the plurality of fins is of a shape projected along the axis of the heated fluid conduit that is circular, elliptical, square, rectangular, or any combination thereof.

12. The anti-icing system of claim 1, wherein the finned conduit is configured to heat the air flowing through the air intake conduit of the gas turbine system to a temperature greater than a first threshold temperature above a dew point of the air flowing through the air intake conduit of the gas turbine system.

13. The anti-icing system of claim 12, wherein the finned conduit is configured to heat the air flowing through the air intake conduit of the gas turbine system to a temperature less than a second threshold temperature.

14. A gas turbine system, comprising:

a compressor; and an air intake system comprising an air intake conduit, a filter system, and an anti-icing system, wherein the air intake system is configured to supply a heated airflow to the compressor and wherein the anti-icing system comprises:

a plurality of finned conduits disposed within the air intake system, upstream of the filter system, wherein each of the plurality of finned conduits comprises:

a heated fluid conduit defining a flowpath extending in an axial direction along the heated fluid conduit; and a plurality of fins spaced along the heated fluid conduit and extending radially outward from the heated fluid conduit;

wherein each of the plurality of finned conduits is configured to receive a heated fluid extracted from the compressor and flowing along the flowpath and to transfer heat from the heated fluid to air flowing through the air intake conduit of the gas turbine system; and an exhaust manifold configured to receive the heated fluid from a finned conduit of the plurality of finned conduits and to direct the heated fluid into the air intake conduit of the gas turbine system downstream of the plurality of finned conduits and the filter system with respect to the air flowing through the air intake conduit.

15. The gas turbine system of claim 14, wherein the anti-icing system comprises:

an intake manifold configured to receive the heated fluid and to distribute the heated fluid to two or more of the plurality of finned conduits;

wherein the exhaust manifold is configured to receive the heated fluid from two or more of the plurality of finned conduits and to direct the heated fluid to a bypass conduit.

16. The gas turbine system of claim 15, wherein the anti-icing system comprises:

a valve configured to control a flow of the heated fluid into the intake manifold; and a controller configured to control operation of the valve.

17. The gas turbine system of claim 15, wherein the bypass conduit is configured to inject the heated fluid into the air intake conduit of the gas turbine system downstream of the plurality of finned conduits and the filter system with respect to the air flowing through the air intake conduit.

18. A method of operating an anti-icing system for a gas turbine system, comprising:

extracting a heated fluid from a compressor of the gas turbine system;

directing the heated fluid through a heated fluid conduit of a finned conduit, wherein the finned conduit is disposed within an air intake conduit of the gas turbine system upstream of a filter with respect to air flowing through the air intake conduit; wherein the finned conduit comprises a plurality of fins spaced in an axial direction along the heated fluid conduit and extending radially outward from the heated fluid conduit, wherein the finned conduit is configured to transfer heat from the heated fluid to the air flowing through the air intake conduit of the gas turbine system;

directing the heated fluid from the finned conduit to an exhaust manifold; and injecting the heated fluid from the exhaust manifold into the air intake conduit at a location downstream of the finned conduit and the filter.

19. The method of claim 18, wherein the finned conduit is configured to heat the air flowing through the air intake conduit of the gas turbine system to a temperature that is greater than a threshold temperature above a dew point of the air flowing through the air intake conduit of the gas turbine system and less than a second threshold temperature.

20. The method of claim 19, comprising controlling a flow of the heated fluid through the heated fluid conduit such that the air flowing through the air intake conduit of the gas turbine system is heated to the temperature that is greater than the threshold temperature above the dew point of the air flowing through the air intake conduit of the gas turbine system and less than the second threshold temperature.

\* \* \* \* \*